United States Patent
Youn et al.

(10) Patent No.: US 10,616,820 B2
(45) Date of Patent: Apr. 7, 2020

(54) BASE STATION CONNECTING METHOD AND USER EQUIPMENT PERFORMING SAME

(71) Applicant: LG ELECTRONICS INC., Seoul (KR)

(72) Inventors: Myungjune Youn, Seoul (KR); Jinsook Ryu, Seoul (KR); Hyunsook Kim, Seoul (KR); Laeyoung Kim, Seoul (KR); Dongsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/749,759

(22) PCT Filed: Aug. 25, 2016

(86) PCT No.: PCT/KR2016/009462
§ 371 (c)(1),
(2) Date: Feb. 1, 2018

(87) PCT Pub. No.: WO2017/034352
PCT Pub. Date: Mar. 2, 2017

(65) Prior Publication Data
US 2019/0021043 A1   Jan. 17, 2019

Related U.S. Application Data

(60) Provisional application No. 62/366,627, filed on Jul. 26, 2016, provisional application No. 62/209,869, filed on Aug. 25, 2015.

(51) Int. Cl.
*H04W 48/10* (2009.01)
*H04L 29/06* (2006.01)
(Continued)

(52) U.S. Cl.
CPC ......... *H04W 48/10* (2013.01); *H04L 65/1016* (2013.01); *H04L 65/1073* (2013.01);
(Continued)

(58) Field of Classification Search
CPC ... H04W 48/10; H04W 8/02; H04W 36/0055; H04W 36/08; H04W 48/16; H04W 48/18;
(Continued)

(56) References Cited

U.S. PATENT DOCUMENTS

2008/0260109 A1   10/2008  Turina
2009/0239555 A1   9/2009   Sim et al.
(Continued)

OTHER PUBLICATIONS

Ericsson White paper, Uen 284 23-3244 | Jan. 2015 (Year: 2015).*
(Continued)

*Primary Examiner* — Kibrom T Hailu
*Assistant Examiner* — Nizam U Ahmed
(74) *Attorney, Agent, or Firm* — Lee Hong Degerman Kang & Waimey

(57) ABSTRACT

The present specification provides a method by which user equipment (UE) is connected to a base station. The method comprises the steps of: receiving broadcasted information from the base station, wherein the broadcasted information includes information of network slices connected to the base station and capability information of the base station; determining a type indicating a service to be provided or a kind of operation on the basis of the information on the network slices and capability information on the base station; transmitting, to the base station, a connection request message including information on the determined type; and receiving a connection accept message for a first network slice among the network slices connected to the base station. The first network slice can be selected by the base station on the basis of the information on the type.

12 Claims, 14 Drawing Sheets

(51) Int. Cl.

| | | |
|---|---|---|
| *H04W 60/00* | (2009.01) | |
| *H04W 8/02* | (2009.01) | |
| *H04W 48/20* | (2009.01) | |
| *H04W 12/06* | (2009.01) | |
| *H04W 36/00* | (2009.01) | |
| *H04W 48/16* | (2009.01) | |
| *H04W 36/08* | (2009.01) | |
| *H04W 12/08* | (2009.01) | |
| *H04W 76/27* | (2018.01) | |
| *H04W 76/10* | (2018.01) | |
| *H04W 48/18* | (2009.01) | |

(52) U.S. Cl.
CPC ............ *H04W 8/02* (2013.01); *H04W 12/06* (2013.01); *H04W 36/0055* (2013.01); *H04W 48/16* (2013.01); *H04W 48/20* (2013.01); *H04W 60/00* (2013.01); *H04W 12/08* (2013.01); *H04W 36/0069* (2018.08); *H04W 36/08* (2013.01); *H04W 48/18* (2013.01); *H04W 76/10* (2018.02); *H04W 76/27* (2018.02)

(58) Field of Classification Search
CPC ..... H04W 48/20; H04W 76/27; H04W 76/10; H04W 12/06; H04L 65/1016
USPC .......................................................... 370/331
See application file for complete search history.

(56) References Cited

U.S. PATENT DOCUMENTS

2014/0086177 A1   3/2014  Adjakple et al.
2017/0367036 A1\*  12/2017  Chen ..................... H04W 76/10

OTHER PUBLICATIONS

5G White Paper By NGMN Alliance (Year: 2015).\*
PCT International Application No. PCT/KR2016/009462, International Search Report dated Nov. 21, 2016, 5 pages.
NGMN Alliance, "NGMN 5G White Paper", Next Generation Mobile Networks, Feb. 2015, 126 pages.
Ericsson, "5G Systems", Ericsson White Paper, Jan. 2015, 15 pages.

\* cited by examiner

BASE STATION CONNECTING METHOD AND USER EQUIPMENT PERFORMING SAME

CROSS-REFERENCE TO RELATED APPLICATIONS

This application is the National Stage filing under 35 U.S.C. 371 of International Application No. PCT/KR2016/009462, filed on Aug. 25, 2016, which claims the benefit of U.S. Provisional Application No. 62/209,869, filed on Aug. 25, 2015, and 62/366,627, filed on Jul. 26, 2016, the contents of which are all hereby incorporated by reference herein in their entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |

TABLE 1-continued

| REFERENCE POINT | DESCRIPTION |
|---|---|
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |
| Rx | A reference point between PCRF and AF (Application Function), AF can be P-CSCF of IMS network. |

Among the reference points shown in FIG. 1, S2a and S2b correspond to a Non-3GPP interface. S2a is a reference point that provides the user plane with the relevant control and mobility support between trusted Non-3GPP access and PDN GW. S2b is a reference point providing the user plane with the associated control and mobility support between the ePDG and the PDN FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 illustrates a connection process in a radio resource control (RRC) layer.

FIG. 5 shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 6 illustrates a connection between an EPC and an IP Multimedia Subsystem (IMS).

Referring to FIG. 6, a MME 51, a S-GW 52, a P-GW 53*a* being connected to an IMS, a P-GW 53*b* being connected to the Internet, and a Policy and Charging Rule Function (PCRF) 58 being connected to the P-GW 53*b*.

The IMS corresponds to a network technology that allows Packet Switching (PS) to be performed in wired terminals as well as wireless terminals based on an Internet Protocol (IP). The IMS was proposed to connect both wired and wireless terminals through the IP (All-IP).

Such network that is based on IMS includes a Call Session Control Function (CSCF) and Interconnection Border Control Functions (IBCF) 62 for performing control signaling, registration, and procedures for sessions. The CSCF may include a Proxy-CSCF (P-CSCF) 61 and a Serving-CSCF (S-CSCF) 63. Additionally, the CSCF may also include an Interrogating-CSCF (I-CSCF). The P-CSCF 61 operates as a first access point for a user equipment (UE) within an IMS-based network. And, the S-CSCF 63 processes a session within the IMS network. More specifically, as an entity that performs the function of routing signaling, the S-CSCF 63 performs routing of a session in the IMS network. And, the I-CSCF operates as an access point with another entity within the IMS network.

In the above-described IMS, an IP-based session is controlled by a session initiation protocol (SIP). As a protocol for controlling sessions, the SIP refers to a signaling protocol specifying a procedure that allows terminals that wish to perform communication to identify one another and to find (or locate) their positions, to generate a multimedia service session between one another, or to delete and/or change the generated session. By using a Uniform Resource Identifier (SIP URI) that is similar to an e-mail address in order to identify each user, the SIP may provide services without being subordinate to the Internet Protocol (IP) address. Although such SIP message corresponds to a control message, the above-described SIP message is transmitted between a UE and an IMS network through an EPC user plane.

Referring to FIG. 6, a first P-GW 53*a* of the EPC is connected to the P-CSCF 61 of the IMS, and the P-CSCF 61 is connected to the IBCF 62, and the IBCF 62 is connected to the S-CSCF 63.

Furthermore, a second P-GW 53*b* of the EPC is connected to a network of an internet service provider.

Hereinafter, an initial access procedure of a UE 10 will be described.

According to the initial access procedure, the EPC may allocate a basic bearer to the UE 10 and may allocate the UE 10. And, the UE 10 may be allocated with an IP from the PGW 53 so as to be capable of using an IMS network and may, then, acquire the address of a P-CSCF 61 in order to perform registration to the IMS network.

FIG. 7 is an exemplary signal flow chart showing an initial access procedure of the UE.

Referring to FIG. 7, when the power of the UE 10 is turned on, in order to perform initial access, as described above with reference to FIG. 5, the UE 10 establishes an RRC connection with an eNodeB 20.

After establishing the RRC connection with the eNodeB 20, the UE 10 transmits an Attach Request message to the MME 51 (S103). The Attach Request message may include a PDN Connectivity Request message. In this case, the UE 10 may request the address of the P-CSCF 61 by using a Protocol Configuration Option (PCO) field.

The MME 51 may be connected to the HSS 54 so as to carry out authentication and security configuration procedures for the UE 10 (S105). The authentication procedure is carried by the MME 51 by first acquiring an authentication vector of the subscriber from the HSS 54, and, then, the MME 51 uses the corresponding authentication vector so as to perform mutual authentication with the UE 10. When the authentication procedure is completed, the MME 51 configures (or sets up) a security key for a message security configuration between the UE 10 and the MME 51.

The MME 51 carries out a location registration procedure so as to notify the HSS 54 that the UE 10 is currently located in area that is managed by the MME 51, and, the, the MME 51 receives a user profile (S107). The above-described location registration procedure may be performed by using a DIAMETER protocol within the S6a interface. Additionally, the user profile that is received by the MME 51 may include an Access Point Name (APN), a P-GW identifier, a Quality of Service (QoS) profile, and so on.

The MME 51 selects a P-GW 53 and transmits a Create Session Request message to the selected P-GW 53 (S109). The Create Session Request message may include a PCO field requesting the address of the P-CSCF 61, and a user profile. The Create Session Request message, which is transmitted by the MME 51, may be delivered to the P-GW 53 through the S-GW 52.

The P-GW 53 allocates the IP of the UE 10 and selects an address list of P-CSCFs 61 that are available to the UE, among a plurality of P-CSCFs 61, according to the PCO field. When required, the P-GW 53 transmits an Indication of IP-CAN Session Establishment message to the PCRF 58 (S111). Thereafter, the P-GW 53 receives an Acknowledge of IP-CON Session Establishment message from the PCRF 58 (S113). The Acknowledge of IP-CON Session Establishment message may include a service policy of the service that is to be provided to the UE 10.

The P-GW 53 transmits a Create Session Response message to the MME 51 (S115). The Create Session Response message may include the IP that is allocated to the UE 10 and an address list of P-CSCFs 61. The Create Session Response message, which is transmitted by the P-GW 53, may be delivered to the MME 51 through the S-GW 52.

The MME 51 transmits an Attach Accept message including an Initial Context Setup Request message to the eNodeB 20. And, the eNodeB 20 transmits an Attach Accept message including an RRC Connection Reconfiguration message and an Activate Default EPS Bearer Context Request message to the UE 10 (S117).

The UE 10 transmits an RRC Connection Reconfiguration Complete message to the eNodeB 20 as a response to the reception of the RRC Connection Reconfiguration message (S119). The eNodeB 20 transmits an Initial Context Setup Response message to the MME 51 as a response to the reception of the Initial Context Setup Request message (S121).

The MME 51 transmits a Modify Bearer Request message to the S-GW 52 as a response to the reception of the Initial Context Setup Response message (S123). The Modify Bearer Request message may include an EPS bearer identifier, an eNodeB address, a handover indication, and so on. The S-GW 52 transmits a Modify Bearer Response message to the MME 51 as a response to the reception of the Modify Bearer Request message (S125).

Hereinafter, an IMS initial registration procedure of the UE 10 will be described.

FIG. 8 is an exemplary flow chart showing an IMS initial registration procedure.

Referring to FIG. 8, the UE 10 transmits a REGISTER message requesting registration to the P-CSCF 61 (S201). The UE 10 may transmit the REGISTER message by using the address of the P-CSCF 61, which is verified through the Activate Default EPS Bearer Context Request message.

The P-CSCF 61 delivers the REGISTER message, which is received from the UE 10, to an I-CSCF 64 by using the address of the I-CSCF 64, which is acquired by through a Domain Name System (DNS) inquiry procedure (S203).

The I-CSCF 64 transmits a User Authorization Request (UAR) message to the HSS 54 (S205). Since an S-CSCF 63 being allocated to the UE 10 does not exist, the HSS 54 a User Authorization Answer (UAA) message including capability information of the UE 10 to the I-CSCF 64 (S207). The capability information corresponding to information sorting the capability that is to be provided to the UE 10 in Attribute Value Pairs (AVPs).

The I-CSCF 64 selects one S-CSCF 63 based on the received capability information and, then, delivers the REGISTER message to the selected S-CSCF 63 (S209).

The S-CSCF 63 transmits a Multimedia Authentication Request (MAR) message to the HSS 54 and requests for authentication information corresponding to the UE 10 (S211). Since the authentication information corresponding to the UE 10 does not exist as the registration corresponds to an IMS initial registration, the HSS 54 transmits a Multimedia Authentication Answer (MAA) message, which indicates that the authentication information is being requested, to the S-CSCF 63 (S213).

The S-CSCF 63 transmits a 401 Unauthorized message for requesting the authentication information to the UE 10 (S215). The 401 Unauthorized message may include the authentication vector, which is received from the HSS, a symmetric key and an authentication algorithm, which are designed by the S-CSCF 63. The 401 Unauthorized message may pass through the I-CSCF 64 and the P-CSCF 61 and may then be delivered to the UE 10.

The UE 10 generates authentication data by using the received authentication vector, symmetric key, and authentication algorithm, and, then, the UE 10 transmits the REGISTER message, which includes the generated authentication data, to the P-CSCF 61 (S217). The P-CSCF 61 delivers the received REGISTER message to the I-CSCF 64 (S219).

The I-CSCF 64 transmits a UAR message to the HSS 54 (S221). Since an S-CSCF 63 being allocated to the UE 10 exists, the HSS 54 transmits a UAA message, which includes identification information of the allocated S-CSCF 63, to the I-CSCF 64 (S223). The I-CSCF 64 delivers the REGISTER message to the S-CSCF 63 (S225).

The S-CSCF 63 compares the authentication data included in the REGISTER message with the authentication information it has transmitted so as to authenticate the UE 10, and, then, the S-CSCF 63 transmits a Server Assignment Request (SAR) message to the HSS 54 (S227). The HSS 54 transmits a Server Assignment Answer (SAA) message to the S-CSCF 63 (S229).

The S-CSCF 63 transmits a 200OK message, which notifies that the registration is completed, to the UE 10 and completes the registration procedure (S231). The 200OK message may pass through the I-CSCF 64 and the P-CSCF 61 and may then be delivered to the UE 10.

<Dedicated Core Network (DCN)>

Hereinafter, a Dedicated Core Network (DCN) will be described in detail. Dedicated Core Networks (DCNs) may be used in order to provide a core network having specific characteristics, functions or scaling, or to separate a specific UE or subscriber. For example, the Dedicated Core Network (DCN) may be used in order to separate a subscriber from an enterprise (or company) or from a separate management domain.

The above-described Dedicated Core Network (DCN) technology supports an effective usage of multiple Dedicated Core Networks (DCNs). Each Dedicated Core Network (DCN) may be configured of one or multiple Core Network (CN) nodes. Each Dedicated Core Network (DCN) may be specialized for a specific service type of the subscriber.

The Dedicated Core Network (DCN) may be positioned in one or multiple Radio Access Technologies (RATs). Herein, the RAT may also correspond to a GSM EDGE Radio Access Network (GERAN), a UMTS Terrestrial Radio Access Network (UTRAN), or an Evolved-UTRAN (E-UTRAN).

One Dedicated Core Network (DCN) may be configured of one or more MMEs and SGSNs. One Dedicated Core Network (DCN) may also be configured to further include one or more S-GWs, P-GWs, and PCRFs. The Dedicated Core Network (DCN) may allocate a subscriber based on a subscriber information (i.e., UE Usage type) and may provide service to the allocated subscriber.

The main functions of the Dedicated Core Network (DCN) is to perform routing and management of the UEs within its own network. Hereinafter, diverse scenarios for supporting the Dedicated Core Network (DCN) will be described.

The Dedicated Core Networks (DCNs) may be positioned in order to support only one RAT. For example, only dedicated MMEs for supporting the E-UTRAN may be positioned, and dedicated SGSNs may not be positioned.

The Dedicated Core Networks (DCNs) may be positioned in order to support multiple RATs or all RATs.

In case the Dedicated Core Network (DCN) cannot be used, or in case information for allocating the UE to the Dedicated Core Network (DCN) does not sufficiently exist, only the basic (or default) Dedicated Core Network (DCN) for managing the UE may be positioned.

The positioning (or arrangement) of the Dedicated Core Network (DCN) according to the above-described scenarios may be determined in accordance with the configurations made by the operator, services having different characteristics or functions, or whether or not a UE exists inside or outside of a service area supporting the Dedicated Core Network (DCN) or RAT.

More specifically, a user information parameter (i.e., UE Usage type) may be used for selecting a Dedicated Core Network (DCN). The operator of the Dedicated Core Network (DCN) may configure (or set up) a UE usage type to which service is intended to be provided. Diverse types of UE usage types may be serviced by the same Dedicated Core Network (DCN).

An HSS may provide a UE usage type value to the MME or SGSN through the subscriber information (or subscription information) of the UE. A serving network may select a Dedicated Core Network (DCN) based on the UE usage type, a local operator policy, and context information related to a UE that can be supported by the serving network. The serving MME or SGSN may select an S-GW and a P-GW based on the UE usage type.

In case sufficient information for selecting a specific Dedicated Core Network (DCN) when performing initial access to the network, a RAN may select one core network node of a default Dedicated Core Network (DCN) and may provide service to the selected core network node. And, when required, the RAN may perform redirection of the UE to another core network.

<Network Slice>

Hereinafter, network slices that are to be adopted in the next generation mobile communication will be described in detail.

In order to provide diverse services through one network, the next generation mobile communication introduces the concept of a network slice. Herein, network slice corresponds to a combination of network nodes having the necessary functions when providing a specific service. A network node, which configures the network slice, may correspond to an independent node as hardware or may correspond to a logically independent node.

A network slice may be configured of a combination of all nodes being required for configuring an entire network. In this case, one network slice may independently provide a service to the UE. On the other hand, a network slice may also be configured of a combination of some of the nodes, among the nodes configuring the network. In this case, instead of independently providing a service to the UE, the network slice may provide a service to the UE in connection with other network nodes. Also, a plurality of network slices may be interconnected to one another in order to provide a service to the UE.

The network slice is different from the dedicated core network (DCN) in that the entire network nodes, which include core network (CN) nodes and RAN, may be separated. Furthermore, network slice is different from the dedicated core network (DCN) in that the network nodes may simply be logically separated.

FIG. 9 is a conceptual view of a network structure adopting network slicing.

Referring to FIG. 9, multiple network slices share functions of one common control plane (CP) (or Common Control Plane(CP) Functions). Each network slice includes a different user plane (UP) function and a non-common CP function. Each base station has basic (or default) control plane functions, which are shared among the network slices, and an interface. However, this does not mean that each base station is connected to all user plane functions corresponding to each of the network slices.

As shown in FIG. 9, Base Station 1 is connected to the user plane functions of Network Slice 1 but not connected to the user plane functions of Network Slice 2. In other words, Base Station 1 supports only Network Slice 1.

Base Station 2 is connected to the user plane functions of Network Slice 1 and Network Slice 2. In other words, Base Station 2 supports both Network Slices 1 and 2.

Base Station 3 is connected to the user plane functions of Network Slice 2 but not connected to the user plane functions of Network Slice 1. In other words, Base Station 3 supports only Network Slice 2.

As described above, the RATs being supported by each base station may be different from one another, and one base station may also support a plurality of RATs.

Meanwhile, the UE measures the signals that are received from the base stations and selects a base station having the highest signal quality. However, in case the described above network slice is adopted, of the UE selects a base station simply based on the quality of the received signal, the UE may not access an adequate network slice that can effectively provide the service that is desired (or wanted) by the UE. Therefore, a solution allowing the UE to select an optimal base station in order to be capable of accessing an adequate network slice is required.

SUMMARY OF THE INVENTION

Technical Objects

Therefore, an object of a disclosure of this specification is to provide a method for accessing a base station by a user equipment in a mobile communication network adopting network slicing.

Technical Solutions

In order to achieve the above-described technical object of the present invention, a disclosure of this specification provides a method for accessing a base station from a user equipment (UE). The method may include the steps of receiving information broadcasted from the base station. The broadcasted information may include information on network slices being connected to the base station and capability information of the base station. The method may comprise determining a type indicating a service type or an operation type that is to be provided, based on the information on the network slices and capability information of the base station, inserting the information on the determined type into an Attach Request message and transmitting the message to the base station, and receiving an Attach Accept message corresponding to a first network slice, among the network slices being connected to the base station. The first network slice may be selected by the base station based on the information on the determined type.

The step of determining a type includes the steps of determining the first type according to configuration elements and processing capability of the UE, determining whether or not a service according to the first type is available for support, based on the information on the network slices and the capability information of the base station, and switching the first type to a second type, if a service according to the first type is not supported.

The broadcasted information may correspond to filtered information of network slices that are unavailable for support by a Radio Access Network (RAN), among the network slices being connected to the base station.

The first network slice may be selected from network slices supporting a service according to the determined type, based on location information of the UE and transmission time of the Attach Request message. Furthermore, the first network slice may be selected from the network slices supporting the service according to the determined type, by considering subscriber information, an Access Point Name (APN), a Data Network Name (DNN), or capability information of the UE.

After receiving the Attach Accept message, the method may further include the steps of receiving information broadcasted from a base station other than the base station having transmitting the Attach Accept message. The broadcasted information includes information on network slices being connected to the other base station and capability information of the other base station. The method may further comprise determining whether or not performing handover to the other base station is possible, based on the information on the network slices being connected to the other base station and the capability information of the other base station, and, if performing handover to the other base station is possible, transmitting an indicator notifying that the handover to the other base station is possible to a network node managing mobility.

The network node managing mobility may determine whether or not to perform handover to the other base station, based on the information included in the indicator. The indicator may include any one of information on a service that is newly started in the UE, information on a service that is ended in the UE, and information on a change in mobility in the UE.

The network node managing mobility may determine to perform handover in a dual connectivity format between an enhanced Long Term Evolution (eLTE) Radio Access Technology (RAT) base station and a fifth generation (5G) RAT base station.

In order to achieve the above-describe technical object, another disclosure of this specification provides a user equipment (UE) for accessing a base station. The user equipment may include a transceiver, and a processor controlling the transceiver. The processor may be configured to control the transceiver so as to receive information broadcasted from the base station. The broadcasted information may include information on network slices being connected to the base station and capability information of the base station. The processor may be configured to determine a type indicating a service type or an operation type that is to be provided, based on the information on the network slices and capability information of the base station, to insert the information on the determined type into an Attach Request message and to transmit the message to the base station, and to receive an Attach Accept message corresponding to a first network slice, among the network slices being connected to the base station. The first network slice may be selected by the base station based on the information on the determined type.

Effects of the Invention

According to a disclosure of this specification, a user equipment may select an optimal base station that can provide network slicing that is adequate for a service, which the user equipment wishes to be provided with, and may then access the selected base station.

DESCRIPTION OF EXEMPLARY EMBODIMENTS

Figure 1:
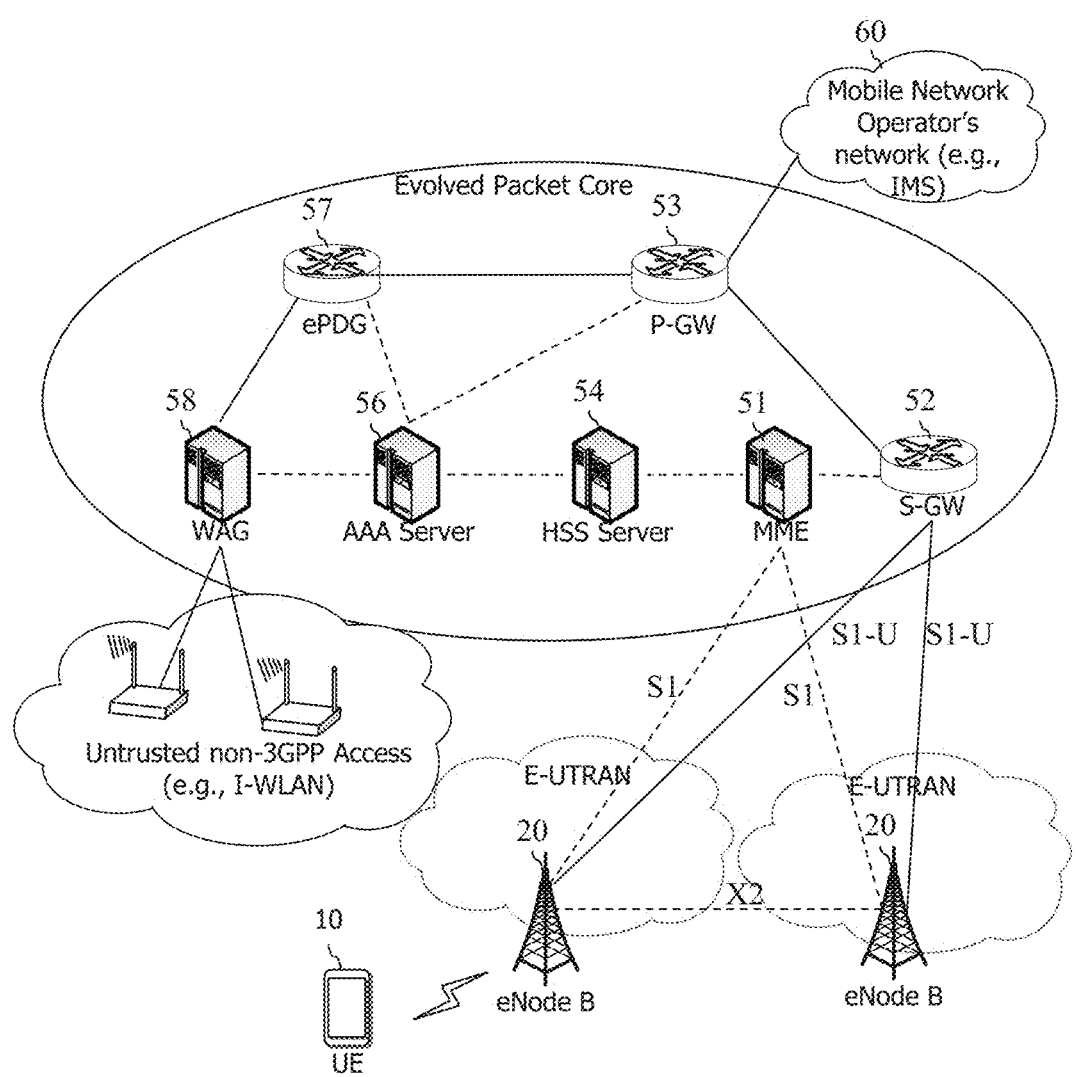
FIG. 1 shows the configuration of an evolved mobile communication network.
Figure 2:
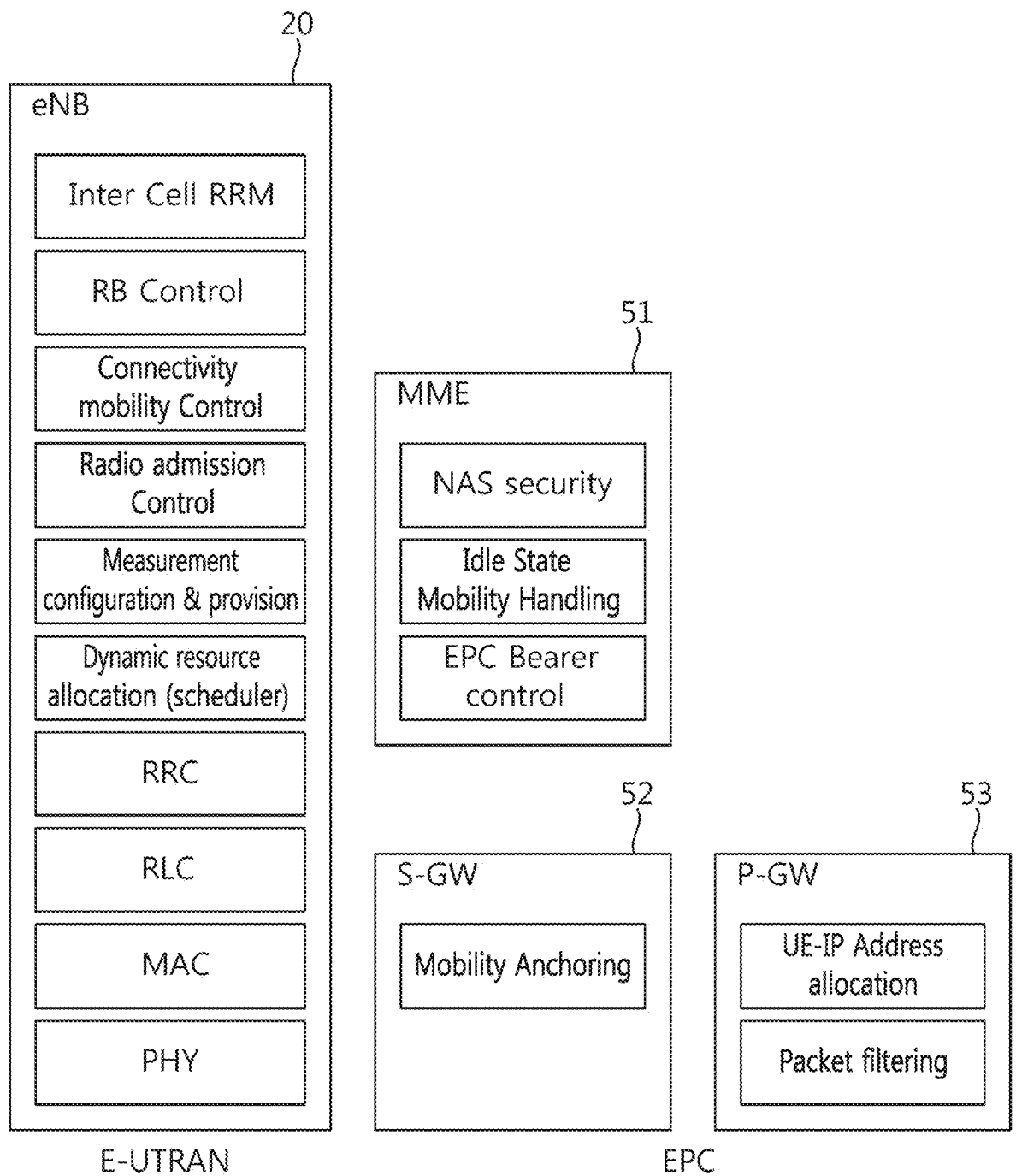
FIG. 2 is an exemplary diagram showing the architecture of a common E-UTRAN and a common EPC.
Figure 3:
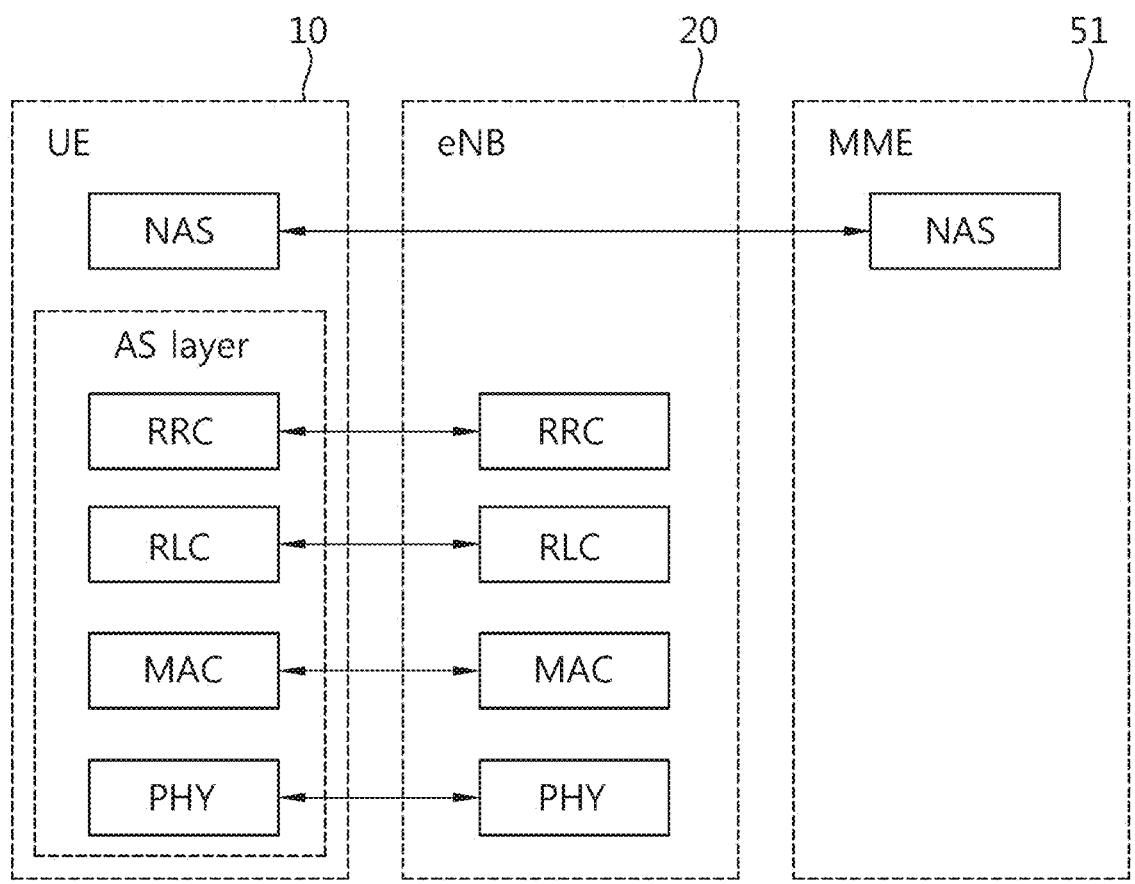
FIG. 3 is an exemplary diagram showing the structure of a radio interface protocol in a control plane between UE and an eNodeB
Figure 4:
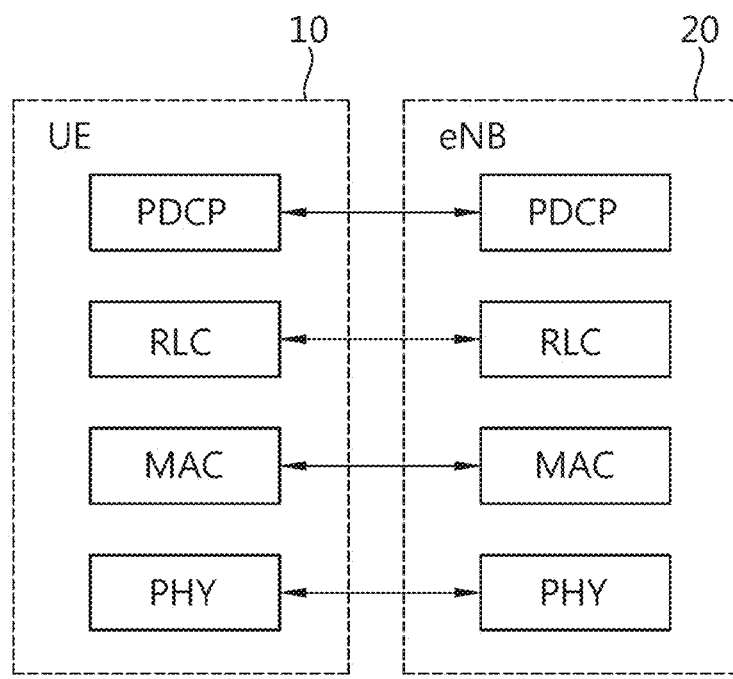
FIG. 4 is another exemplary diagram showing the structure of a radio interface protocol in a control plane between UE and an eNodeB.
Figure 5:
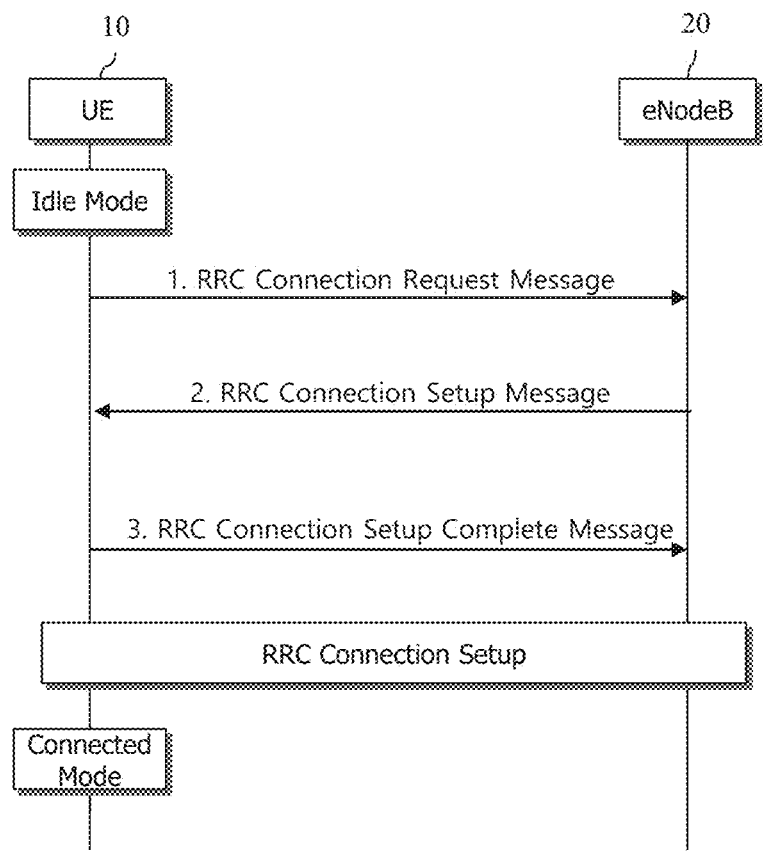
FIG. 5 illustrates a connection process in a radio resource control (RRC) layer.
Figure 6:
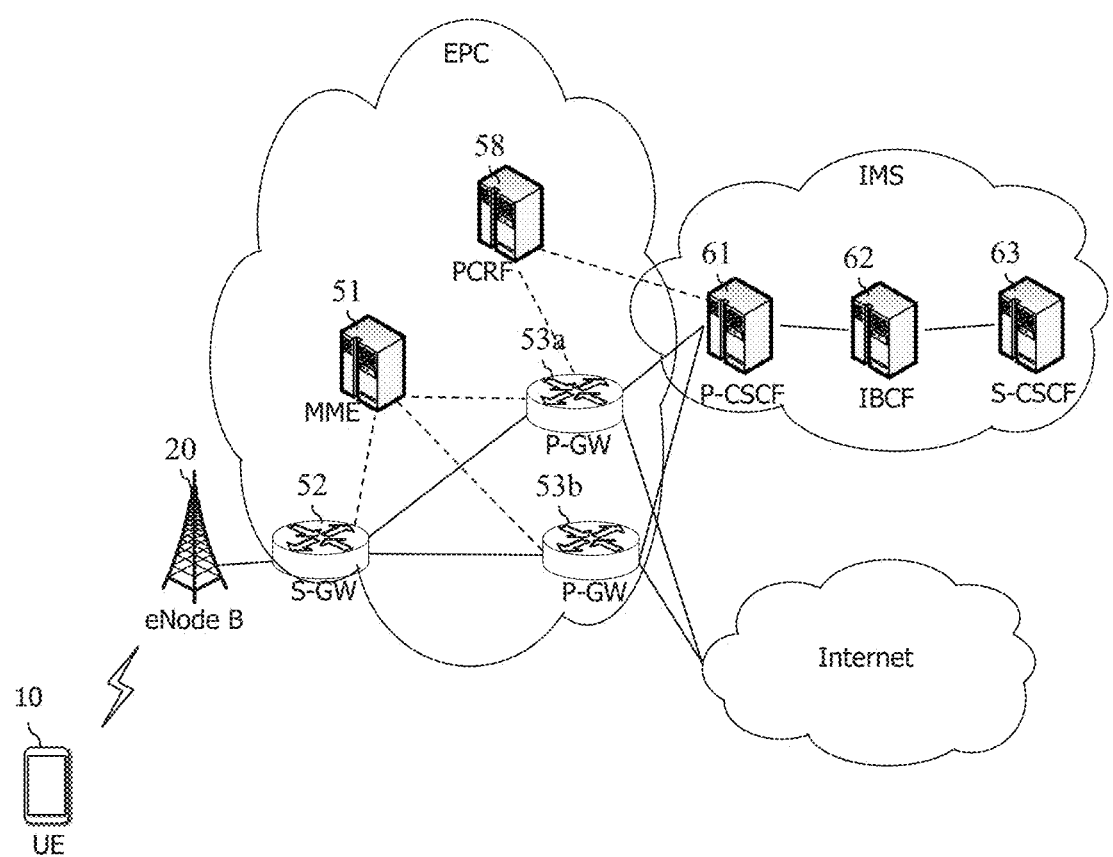
FIG. 6 illustrates a connection between an EPC and an IP Multimedia Subsystem (IMS).
Figure 7:
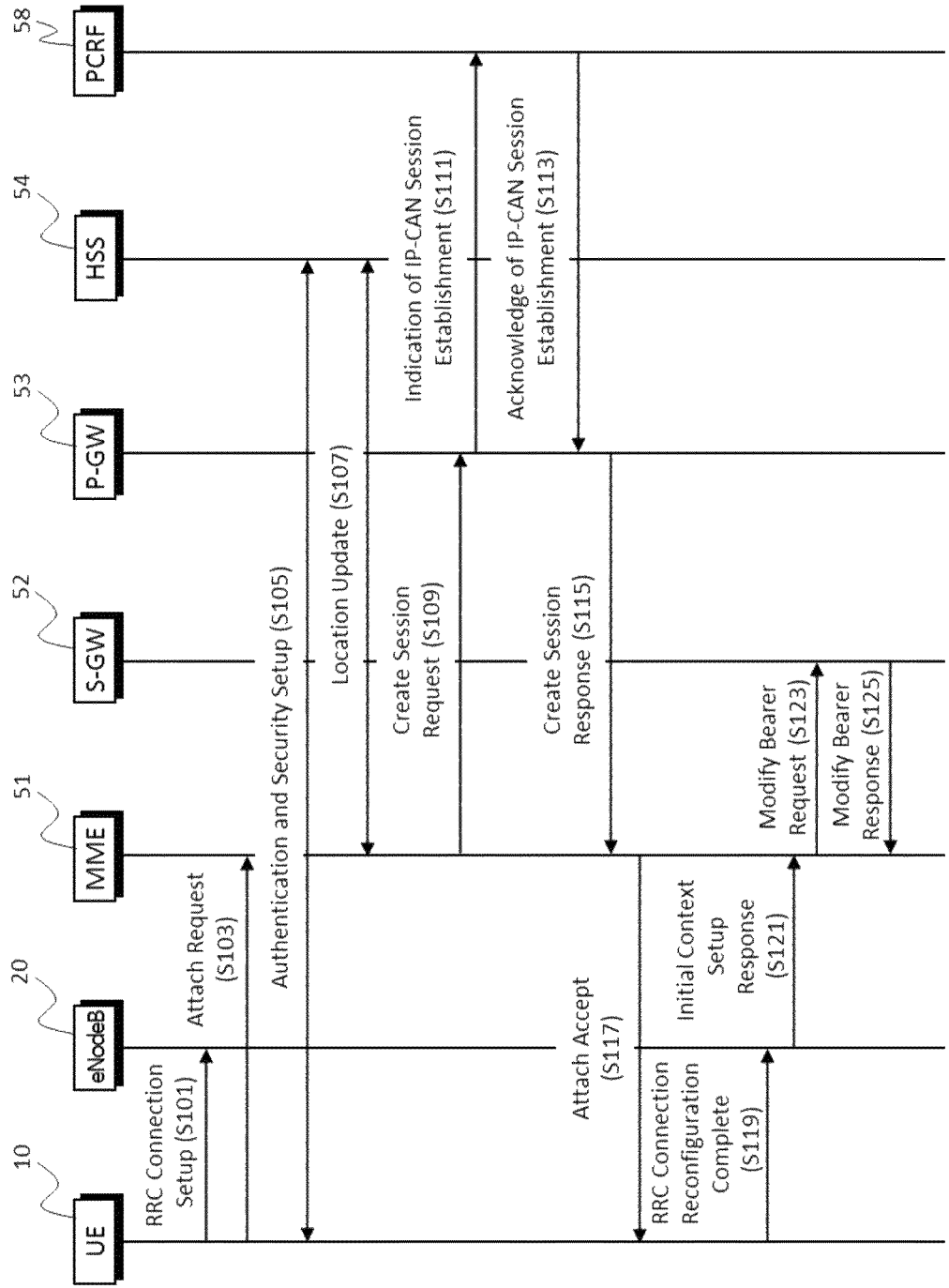
FIG. 7 is an exemplary signal flow chart showing an initial access procedure of the UE.
Figure 8:
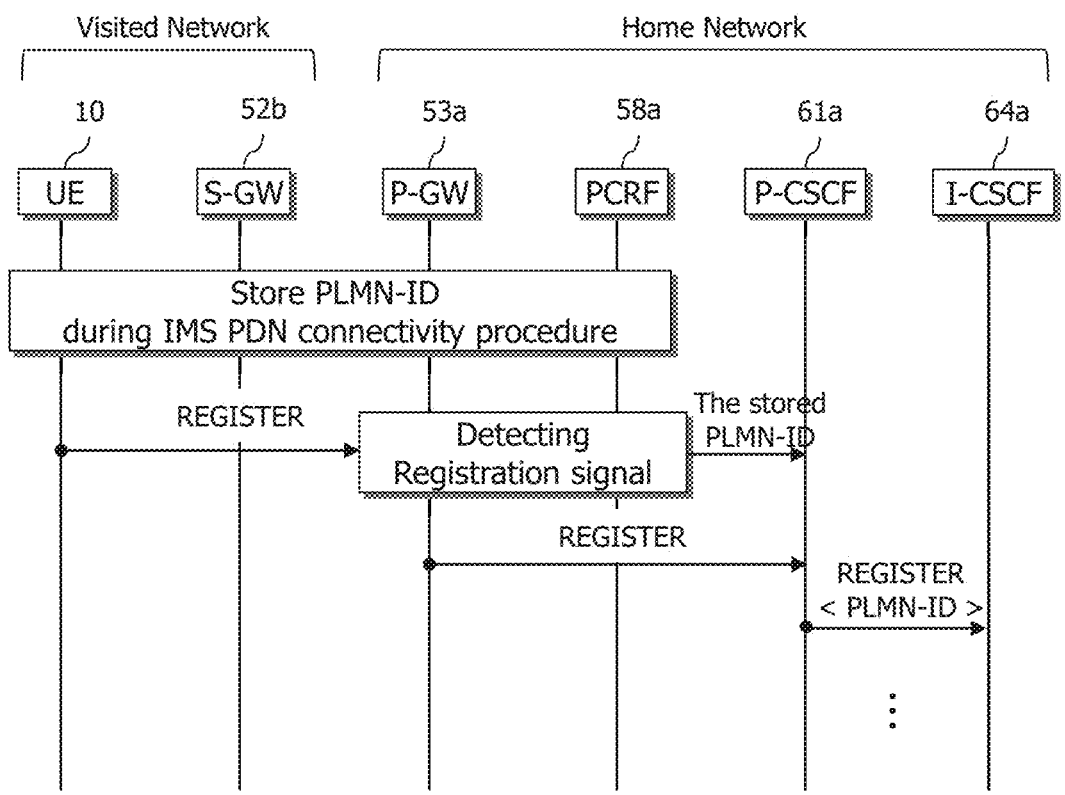
FIG. 8 is an exemplary flow chart showing an IMS initial registration procedure.
Figure 9:
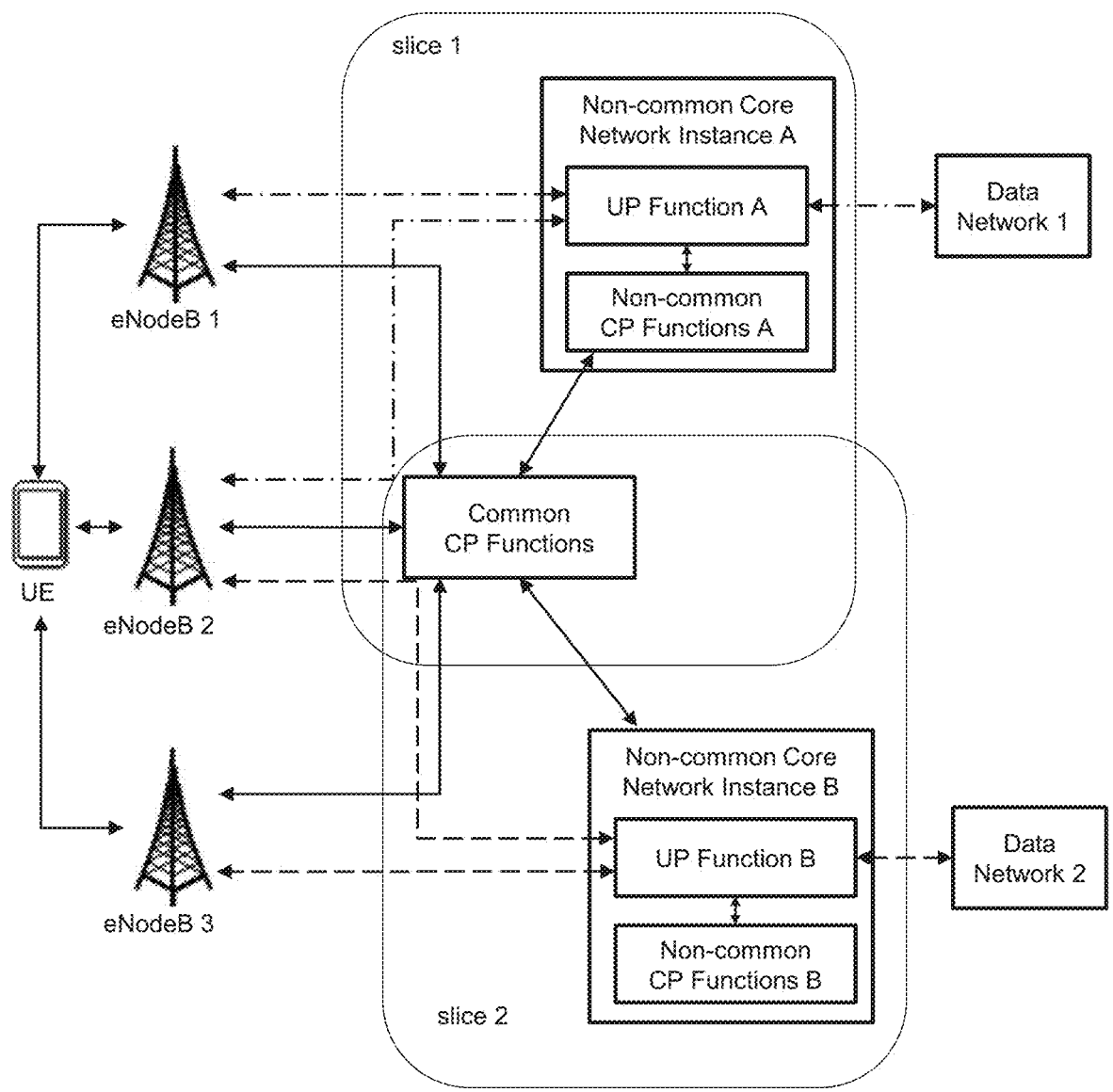
FIG. 9 is a conceptual view of a network structure adopting network slicing.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF) is a node of an EPS network which performs different QoS for each service flow and a policy decision for dynamically applying a charging policy.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A Tunnel Endpoint Identifier (TEID) is an end point ID of a tunnel set up between nodes within a network and is set in each section as a bearer unit of each terminal.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority).

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

A Network Slice is a combination of network nodes having functions that are required for providing a specific service. A network node, which configures the network slice, may correspond to an independent node as hardware or may correspond to a logically independent node.

Meanwhile, the exemplary embodiments that will hereinafter be proposed may be implemented independently. However, a combination of multiple exemplary embodiments may also be implemented.

Disclosure of this Specification

This specification relates to a mobile communication network adopting network slicing. And, therefore, this specification proposes a method for selecting an optimal base station so as to allow a UE to access an adequate network slice.

1. Solution for Selecting an Optimal Base Station

A base station 20 broadcasts information required by a UE 10 for accessing the base station 20. At this point, the information being broadcasted by the base station may include information on network slices being connected to the base station and capability information of the base station. The information on the network slices, which correspond to the broadcasting target, may be pre-configured in the base station by a service provider or may be received by the base station 20 from a common plane (CP) function whenever required.

More specifically, information on the network slices may include functions supported by the corresponding network slice, configuration information of the network slice, and load information of the network slice. For example, the functions supported by the corresponding network slice may include Low Latency Radio (LLR) capability, Mobile BroadBand (MBB) capability, Ultra Reliable Radio (URR) capability, and so on. The configuration information of the network slice may include coverage information of the network slice, and information on network nodes configuring the network slice. And, the capability information of the base station may include functions supported by the base station, processing capability of the base station, and load information.

Most particularly, instead of broadcasting information on all of the network slices available for service, the base station 20 may filter the information on specific network slices. More specifically, the base station 20 may filter only the information on specific network slices from the information on all of the network slices available for service, by considering the condition of a core network, radio resources available for usage, a number of accessed (or connected) UEs, and a number of UEs being provided with a specific service.

For example, in case the number of UEs being provided with a service from a specific network slice is greater than a threshold value, or in case the base station receives an indication notifying that a congestion has occurred from a specific network slice, the base station may filter the information on the corresponding network slice. Alternatively, although a specific network slice is supported by a common plane (CP) function, in case the corresponding network slice is not supported by the RAN, the base station may filter the information on the corresponding network slice. Conversely, the base station may broadcast information on all of the network slices being supported by the common plane (CP) function. Herein, however, the base station may further include and broadcast information for indicating network slices that are not supported by the RAN.

Meanwhile, the UE 10 may have diverse types in accordance with its configuration elements or processing capability. More specifically, the type of the UE 10 may indicate a service, which the UE wishes to receive (or to be provided with), or an operation type of the UE. For example, in case the UE monitors its surroundings by using a sensor, which is a configuration element of the UE, the corresponding UE may be operated in accordance with the IoT type. In case the UE provides a hot spot for providing internet service to another device, the corresponding UE may be operated in accordance with a tethering type. Alternatively, in case the user of the UE uses a voice or video phone service, the corresponding UE may be operated in accordance with a phone type.

The UE 10 may change the UE type based on the information on the network slices, which is broadcasted by the base station 20, or the capability information of the base station. For example, in case the UE was being operated in the IoT type but information on network slices supporting IoT is not included in the information on the network slices received from the base station, the corresponding UE 10 may change its UE type to an Internet Access type. More specifically, in case the service, which the UE 10 wishes to be provided with, is not supported, the UE 10 may change its UE type based on the information on the network slices or the capability information of the base station. And, the UE 10 may determine the information on the service that is being used in accordance with the type of the service that is being executed.

The UE 10 transmits the type of the UE 10, which is changed or determined based on the information that is received from the base station 20, and information on the service that is currently being used to the base station 20. For example, the UE of a 3GPP network may transmit the determined type of the UE 10 and the information on the service that is being used to the eNodeB by using an Access Stratum (AS) layer protocol.

The base station (or eNodeB) 20 selects a network slice that is adequate for the UE 10 based on the type of the UE 10 and the information on the service that is being used, which are received from the UE 10. Most particularly, the base station 20 may select a network slice that is adequate for the UE 10 based on one of the following information listed below or a combination of a plurality of the following information.

The base station may select a network slice in accordance with the location of the UE.

For example, the base station may select a network slice that is adequate for the UE in accordance with the type of building or the type of place where the UE is located.

The base station may select a network slice in accordance with the type of the UE or the service that is being used by the UE.

For example, the base station may select network slices each being different from one another depending upon whether the UE type corresponds to the IoT type or the tethering type. Alternatively, the base station may select network slices each being different from one another depending upon whether the UE is using an Internet service or an IMS service.

The base station may select a network slice in accordance with the subscription (or subscriber) information of the UE.

For example, the base station may select network slices each being different from one another in accordance with a membership level of the subscriber of the UE, a monthly minimum usage fee, or a down-payment of the usage fee.

The base station may select a network slice in accordance with the functions that are supported by the network slice.

For example, the base station may select a network slice that can provide functions that are required for the service that is being used by the UE in accordance with the Low Latency Radio (LLC) capability, the Mobile BroadBand (MBB) capability, or the Ultra Reliable Radio (URR) capability, which are supported by the network slice.

The base station may select a network slice in accordance with time information.

For example, the base station may select a network slice in accordance with a comparison result between a current time information and a service providing time of a place (or location) where the UE is located.

In case the UE 10 transmits the conventional (or existing) UE type to the base station 20 instead of changing the UE type based on the information that is broadcasted from the base station 20, the base station 20 may select a network slice that is adequate for the UE 10 based on the conventional (or existing) UE type that is received from the UE 10, other information received from the UE, and the network condition (or status). Herein, other information being received from the UE may include an Access Point Name (APN), a Data Network Name (DNN), capability information of the UE, and so on.

Furthermore, the base station 20 may deliver a REGISTER request of the UE 10 to the selected network slice. In case the base station 20 is capable of selecting a network slice that is adequate for the UE 10, the base station may transmit an indicator notifying the UE 10 to access another base station to the UE 10.

Figure 10:
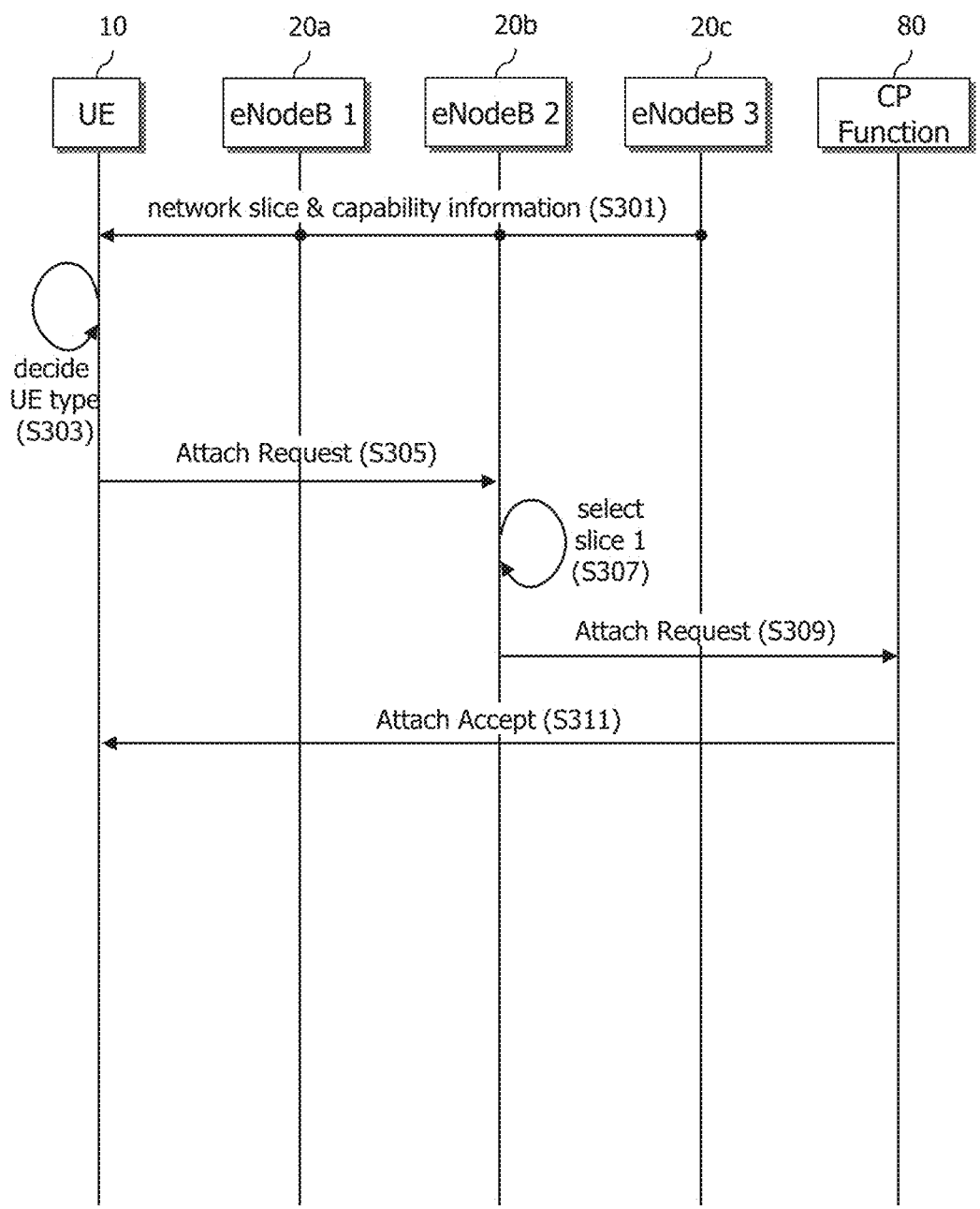
FIG. 10 is a signal flow chart for describing a solution for selecting an optimal base station according to this specification.

FIG. 10 is a signal flow chart for describing a solution for selecting an optimal base station according to this specification.

Referring to FIG. 10, the UE 10 receives information broadcasted from neighboring base stations 20*a*, 20*b*, and 20*c* (S301). The information being broadcasted from the neighboring base stations 20*a*, 20*b*, and 20*c* may include information on network slices being connected to each base station and capability information of each base station.

The UE 10 determines a UE type based on the received information (S303). In case a predetermined UE type, which is predetermined in accordance with the configuration element or processing capability of the UE, exists, the UE may change the pre-determined UE type based on the received information.

The UE 10 transmits an Attach Request message to Base Station 2 20*b* (S305). The Attach Request message may include a determined UE type and information on the service that is being used. Also, the Attach Request message may be transmitted by using an AS layer protocol. Base Station 2 20*b* may correspond to a base station being selected in accordance with the quality of a radio signal, or may correspond to a based station being selected by the UE 10 based on information that is broadcasted from neighboring base station.

Base Station 2 20*b* selects a network slice that is adequate for the UE 10 based on the type of the UE and the information on the service that is currently being used (S307). Then, Base Station 2 20*b* delivers the Attach Request message, which is received from the UE 10, to a control plane (CP) function 80 controlling the selected network slice (S309).

Thereafter, the control plane function 80 registers the UE 10 for the selected network slice and then transmits an Attach Accept message corresponding to the selected network slice to the UE 10 (S311).

2. Solution for Switching a Base Station in a Connected Mode 2-1. Solution for Determining Switching of a Base Station by the Network After the UE 10 is registered to the network, a network node that manages the mobility of the UE 10 may guide the UE 10 to be connected to another base station, which the network node considers to be more advantageous for the UE 10 in light of mobility as compared to the base station 20 to which the UE 10 is currently connected. For example, the network node that manages mobility may determine that, in the aspect of load balancing or network management, it is more advantageous for the UE 10 to be connected to a base station other than the base station 20 to which the UE 10 is currently connected. Herein, the network node managing the mobility of the UE 10 may correspond to the control plane (CP) function.

For this, the control plane function may determine whether or not the base station 20, which is connected to the UE 10, needs to be changed based on whether or not an event, such as a change of service or mobility (or relocation) of the UE 10, has occurred in the UE 10, or in accordance with a pre-determined cycle period.

For example, in case a UE, which is currently connected to a 5G RAT and is being provided with a video streaming service, newly requests for a phone call service, the control plane function may change the base station to an eLTE RAT supporting wireless enhanced LTE (eLTE), which can provide stable phone call services to the UE. In case the mobility of the UE being connected to the 5G RAT increases, the control plane function may change the base station to an eLTE RAT having a relatively wider cell coverage. In case the data usage of the UE being connected to the eLTE RAT increases, the control plane function may change the base station to the 5G RAT that can provide a relatively faster communication speed. Alternatively, the control plane function may change the base station to a dual connectivity between the eLTE RAT and the 5G RAT.

In order to determine whether or not a change of the base station is required, a control plane function managing the UE 10 is required to have the identifier of the base stations that are connected to the control plane function, capability information of each base station, and a network topology related to the location information of the UE stored therein. The network topology may be pre-configured in the control plane function by the service provider.

In case the mobility of the UE 10 is changed, a new service is started (or initiated), or an existing service is ended, the UE 10 may transmit wireless access information on its surroundings to which the UE 10 may be connected and location information of the UE 10 to the control plane function. The control plane function determines whether or not a change of the base station 20 to which the UE 10 is connected is required, based on the received wireless access information and location information.

2-2. Solution for Determining Switching of the Base Station by the UE

After the UE 10 is registered to the network, in case the mobility of the UE 10 is changed, a new service is started (or initiated), or an existing service is ended, if the UE 10 determines that it is more advantageous to be connected to another base station other than the base station 20 to which the UE 10 is currently connected, the UE 10 may request to be connected to the other base station.

For this, the UE 10 searches for a base station that is connected to the network slice being adequate for the service, which the UE 10 wishes to be provided with, based on the information that is broadcasted from the neighboring base stations. The UE 10 determines whether or not a handover (HO) can be carried out to the searched (or discovered) base station. In case the handover (HO) can be carried out to the searched (or discovered) base station, the UE 10 transmits an indicator, which notifies that the handover (HO) can be carried out to the searched (or discovered) base station, to the control plane function. Herein, the indicator may include information on the network slices that are adequate for the service, which the UE 10 wishes to be provided with, or information on the searched (or discovered) base station. Additionally, the indicator may also include reasons for performing the handover, such as information on a service that is being newly started (or initiated), information on a service that is being ended, or information on the change in mobility, and so on.

The control plane function that has received the indicator determines whether or not handover of the UE 10 needs to be performed to the other base station based on the subscriber (or subscription) information of the UE, the network condition (or status), mobility of the UE, and so on. If it is determined that the handover of the UE 10 needs to be performed to the other base station, the control plane function transmits a handover (HO) command to the base station. The HO command may include information on the network slices that are adequate for the service, which the UE 10 wishes to be provided with, or information on the searched (or discovered) base station.

The base station that has received the HO command may select a base station that will actually perform the handover, based on the information included in the HO command and a measurement report received from the UE 10, and, then, the base station performs the handover procedure to the newly selected base station.

Figure 11:
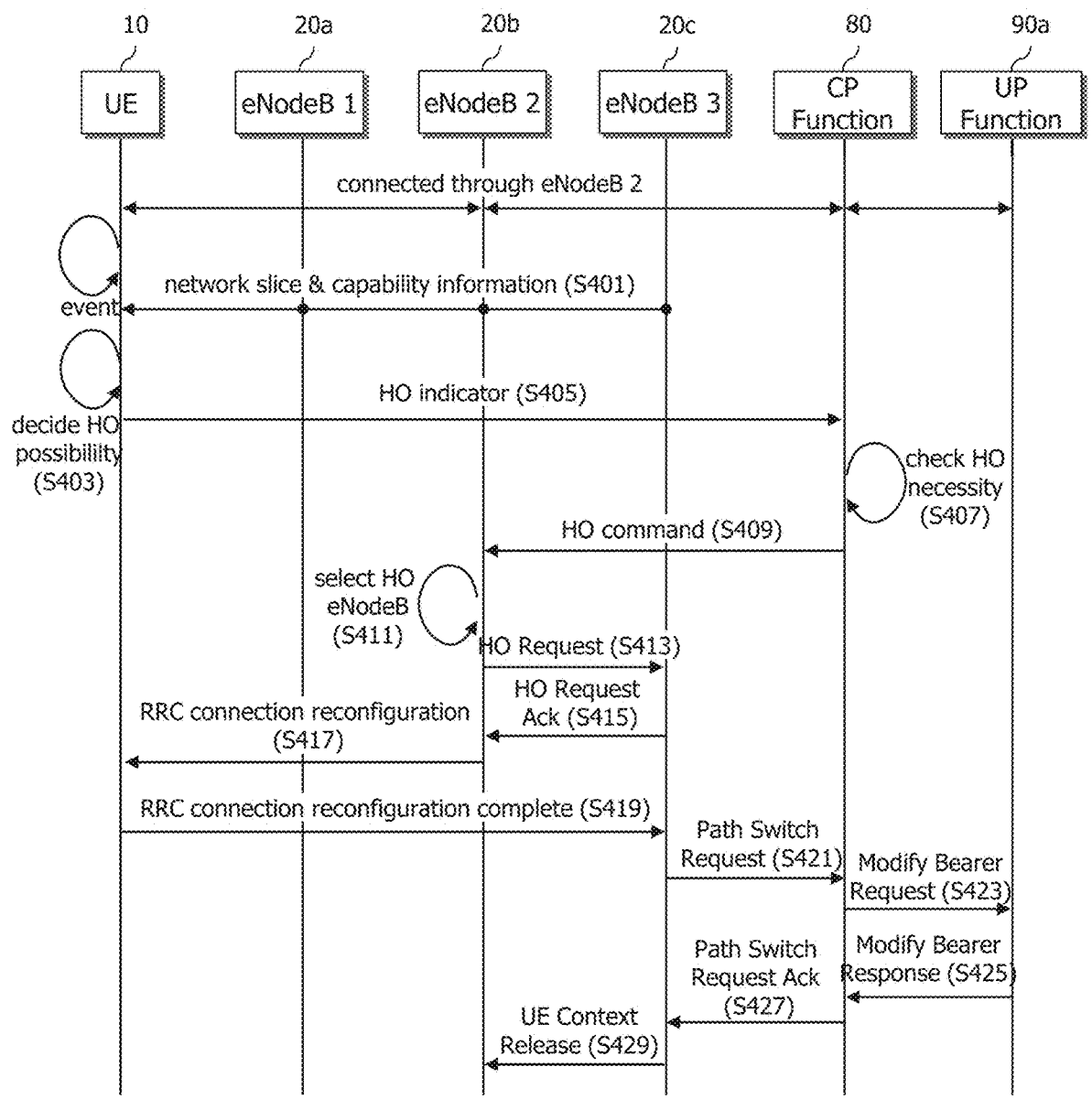
FIG. 11 is a signal flow chart for describing a solution for switching a base station according to this specification.

FIG. 11 is a signal flow chart for describing a solution for switching base station according to this specification.

The UE 10 assumes that it is receiving a control plane function 80 of the network through Base Station 2 20*b* and a service from a user plane 90*a* of Network Slice 2.

Referring to FIG. 11, after the UE 10 is registered to the network, in case the mobility of the UE 10 is changed, a new service is started (or initiated), or an existing service is ended, the UE 10 my received information that is broadcasted from the neighboring base stations 20*a*, 20*b*, and 20*c* (S401).

Based on the received information, the UE 10 determines 10 determines whether or not a handover (HO) can be carried out to Base Station 3 20*c* that is connected to the network slice being adequate for the service, which the UE 10 wishes to be provided with (S403). In case the handover can be performed to Base Station 3 20*c*, the UE 10 transmits an indicator, which notifies that the handover can be carried out, to the control plane function 80 after passing through Base Station to 20*b* (S405). Herein, the indicator may include information on the network slices that are adequate for the service, which the UE 10 wishes to be provided with, or information on the searched (or discovered) base station. Additionally, the indicator may also include reasons for performing the handover, such as information on a service that is being newly started (or initiated), information on a service that is being ended, or information on the change in mobility, and so on.

The control plane function 80 determines whether or not handover of the UE 10 needs to be performed to Base Station 3 20*c* based on the subscriber (or subscription) information of the UE, the network condition (or status), mobility of the UE, and so on (S407). According to the determined result, if it is determined that the handover of the UE 10 needs to be performed to Base Station 3 20*c*, the control plane function 80 transmits a handover (HO) command to Base Station 2 20*b* (S409). The HO command may include information on the network slices that are adequate for the service, which the UE 10 wishes to be provided with, or information on the searched (or discovered) base station.

Base Station 2 20*b* selects Base Station 3 20*c* that will actually perform the handover, based on the information included in the HO command and a measurement report received from the UE 10 (S411). Base Station 2 20*b* transmits a HO Request message to the selected Base Station 3 20*c* (S413) and, then, receives a HO Request ack message from Base Station 3 20*c* (S415). Thereafter, Base Station 2 20*b* transmits a RRC connection reconfiguration message corresponding to Base Station 3 20*c* to the UE 10 (S417).

The UE 10 accesses Base Station 3 20*c* and transmits a RRC connection reconfiguration complete message (S419). Meanwhile, the UE 10 may notify the control plane function that the UE 10 has accessed Base Station 3 20*c* through a Tracking Area Update (TAU), and so on.

Base Station 3 20*c* transmits a Path Switch Request message for requesting a path switch to the control plane function 80 (S421).

The control plane function 80 transmits a Modify Bearer Request message for generating a bearer as Base Station 3 20*c* to the user plane 90*a* of Network Slice 1 (S423) and, then, receives a Modify Bearer Response message from the user plane 90*a* (S425). Thereafter, the control plane function 80 transmits a Path Switch Request ack message to Base Station 3 20*c* (S427).

Base Station 3 20*c* transmits a UE Context Release message to Base Station 2 20*b* (S429).

3. Solution for Switching Base Station in Idle Mode

After the UE 10 is registered to the network, in case the UE does not perform communication with the network for a predetermined period of time, the base station 20 may collect (or retrieve) radio resources that were allocated to the UE 10, and the UE 10 enters an Idle mode and goes on stand-by.

While the UE 10 is on stand-by in the Idle mode, the UE 10 periodically monitors the information broadcasted from the neighboring base stations. The UE 10 selects another base station in which it intends to camp based the information broadcasted from the neighboring base stations. More specifically, apart from the radio signals received from the neighboring base station, the UE 10 may select another base station in which it intends to camp based on information on network slides being connected to each base station, configuration elements or processing capability of the UE, functions of the UE, values preconfigured by the user, and so on.

In case the UE 10, which has selected the other base station in which it intends to camp, satisfies with the predetermined conditions, the UE 10 may perform the location registration procedure (e.g., the TAU procedure). For example, the UE may perform the location registration procedure in case a predetermined period of time has elapsed from a time point at which the UE has performed its last communication with the network, or in case the UE has deviated from or entered an area that is predetermined by the network.

4. Solution for Re-Selecting a Base Station by a Network

When the control plane function determines that it is more advantageous for the UE 10 to be connected to another base station other than the base station 20 that is currently connected, based on the operations of the UE 10 or the information on the base stations being connected to the control plane function, the control plane function may guide the UE 10 to be connected to the other base station. For example, in the aspect of load balancing or network management, the control plane function may determine that it is more advantageous for the UE 10 to be connected to another base station other than the base station 20 that is currently connected.

The control plane function transmits a base station Re-selection command to the base station 20 to which the UE 10 is currently connected. The base station Re-selection command may include information on the other base station to which the UE is to be connected. The base station 20 that is currently connected to the UE 10 transmits a Re-selection Request message to the other base station and receives a Re-selection Request ack message from the other base station. Thereafter, the base station 20 that is currently connected to the UE 10 transmits a RRC Connection Reconfiguration message corresponding to the other base station to the UE 10.

The UE 10 accesses the other base station and transmits a RRC connection reconfiguration complete message. Meanwhile, the UE 10 may notify the control plane function that the UE 10 has accessed the other base station through a TAU, and so on.

The other base station transmits a Path Switch Request message for requesting a path switch to the control plane function 80 and generates a bearer between the other base station and the user plane. Thereafter, the other base station transmits a UE Context Release message to the base station to which the UE 10 was previously (or initially) connected.

Figure 12:
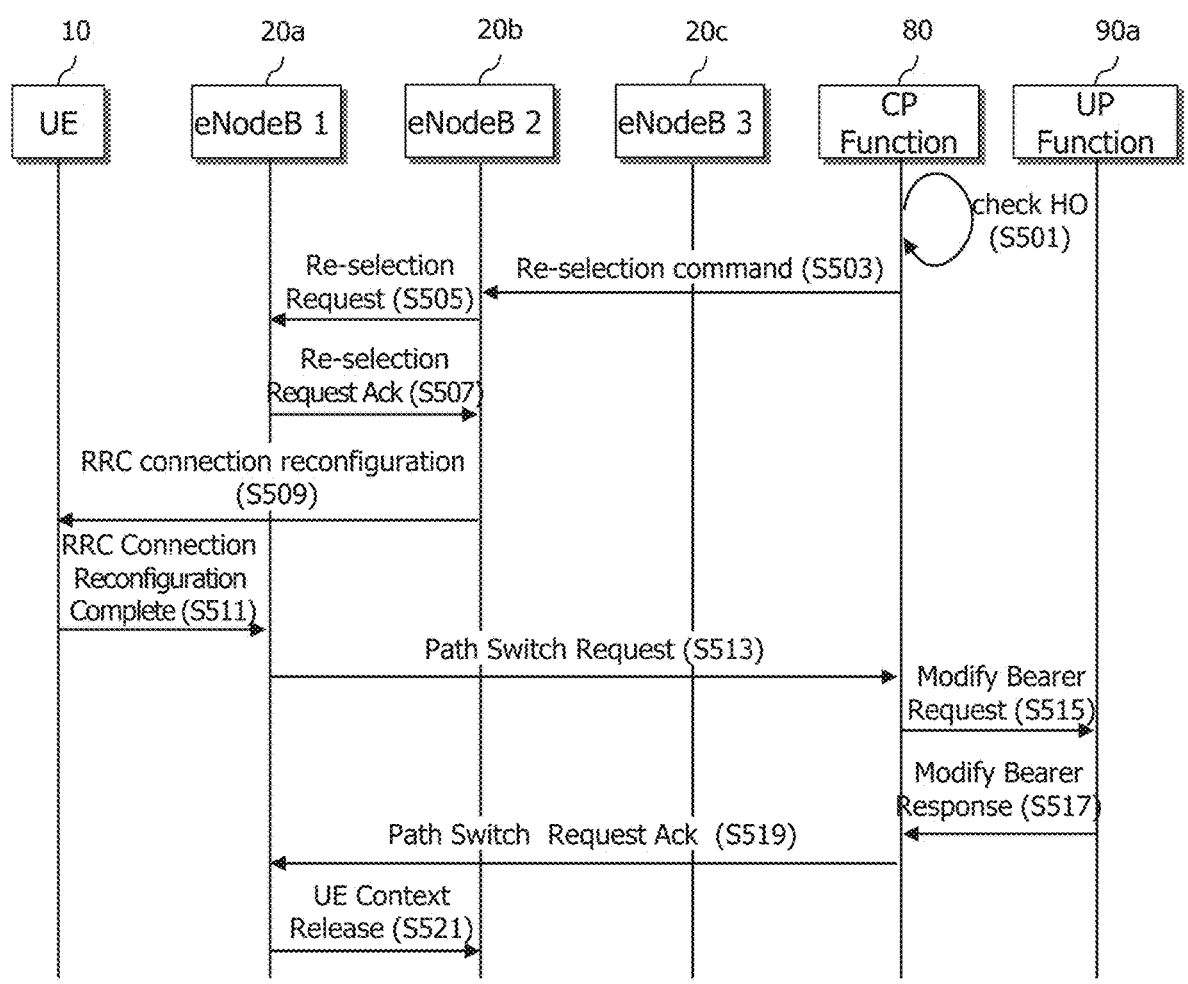
FIG. 12 is a signal flow chart for describing a solution for re-selecting a base station according to this specification.

FIG. 12 is a signal flow chart for describing a solution for re-selecting a base station according to this specification.

The UE 10 assumes that it is receiving a control plane function 80 of the network through Base Station 2 20b and a service from a user plane 90a of Network Slice 2.

Referring to FIG. 12, the control plane function 80 determines whether it is more advantageous for the UE 10 to be connected to Base Station 1 20a than to Base Station 2 20b (S501).

If the control plane function 80 determines that it is more advantageous for the UE 10 to be connected to Base Station 1 20a, the control plane function 80 transmits a base station Re-selection command to Base Station 2 20b (S503). The base station Re-selection command may include information on Base Station 1 20a.

Base Station 2 20b transmits a Re-selection Request message to Base Station 1 20a (S505) and receives a Re-selection Request ack message from Base Station 1 20a (S507). Thereafter, Base Station 2 20b transmits a RRC Connection Reconfiguration message corresponding to Base Station 1 20a to the UE 10 (S509).

The UE 10 accesses Base Station 1 20a and transmits a RRC connection reconfiguration complete message (S511). Thereafter, Base Station 1 20a transmits a Path Switch Request message to the control plane function 80 (S513).

The control plane function 80 transmits a Modify Bearer Request message requesting the bearer to be modified to Base Station 1 20a to the user plane 90a of Network Slice 1 (S515) and, then, receives a Modify Bearer Response message from the user plane 90a (S517). Thereafter, the control plane function 80 transmits a Path Switch Request ack message to Base Station 1 20a (S519).

Base Station 1 20a transmits a UE Context Release message to Base Station 2 20b (S521).

Figure 13:
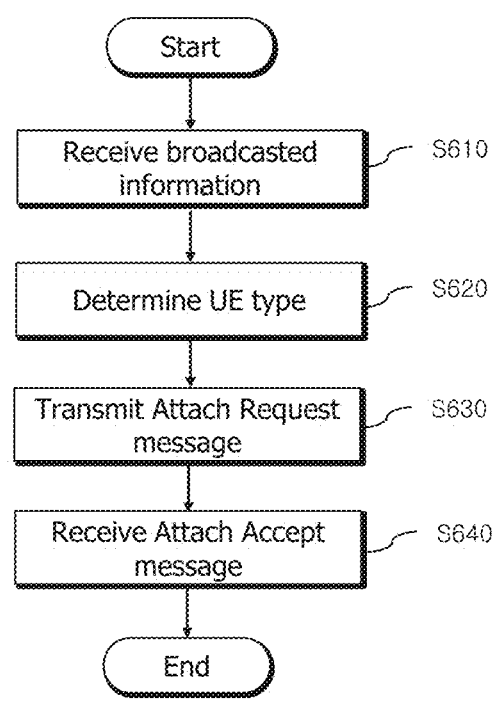
FIG. 13 is a flow chart showing a method for accessing a base station according to a disclosure of this specification.

FIG. 13 is a flow chart showing a method for accessing a base station according to a disclosure of this specification.

Referring to FIG. 13, the UE 10 receives information that is broadcasted from the base station 20 (S610). The information being broadcasted may include information on network slices being connected to the base station 20 and capability information of the base station 20. Most particularly, instead of broadcasting information on all of the connected network slices, the base station 20 may filter the information on specific network slices. For example, among the connected network slices, the base station 20 may filter the information on network slices that cannot be supported by Radio Access Network (RAN).

The UE 10 may determine the UE type based on the information on the network slices, which is received from the base station, and the capability information of the base station (S620). Most particularly, in case it is determined that a first type, which is determined in accordance with the configuration elements and processing capability of the UE, cannot be supported, based on the information of the network slices and the capability information of the base station, the determined first type may be switched (or modified) to a second type.

The UE 10 includes the information on the determined type in the Attach Request message and transmits the corresponding message to the base station 20 (S630).

Thereafter, the UE 10 receives an Attach Accept message corresponding to a first network slice, among the plurality of network slices connected to the base station 20 (S640). The first network slice may be selected by the base station 20 based on the type of the UE and the information on the service that is being used by the UE. Most particularly, the first network slice may be selected from a plurality of network slices supported the service according to the UE type, based on the location information of the UE and a transmission time of the Attach Request message.

Meanwhile, after the UE 10 is registered to the network, in case the mobility of the UE 10 is changed, a new service is started (or initiated), or an existing service is ended, handover of the UE 10 to another base station may be carried out.

More specifically, the UE 10 may receive information that is broadcasted from the base station that has transmitted the Attach Accept message and from another base station. Thereafter, the UE may determine whether or not handover can be carried out to the other base station, based on the information on the network slices and the capability information of the base station that are included in the broadcasted information.

In case the handover (HO) can be carried out to the other base station, the UE 10 transmits an indicator, which notifies that the handover (HO) can be carried out to the other base station, to the control plane function. Herein, the indicator, which notifies that the handover can be carried out, may include information on a service that is being newly started (or initiated) in the UE, information on a service that is being ended in the UE, or information on the change in mobility of the UE.

In this case, the control plane function may determine whether or not to perform handover to the other base station, based on the information included in the indicator. Most particularly, the control plane function may also determine whether or not to perform handover in a dual connectivity mode between an eLTE RAT base station and a 5G RAT base station.

The exemplary embodiments of the present invention may be implemented through diverse means. For example, the exemplary embodiments of the present invention may be implemented in the form of hardware, firmware, and software, or a combination of two or more of the same.

Figure 14:
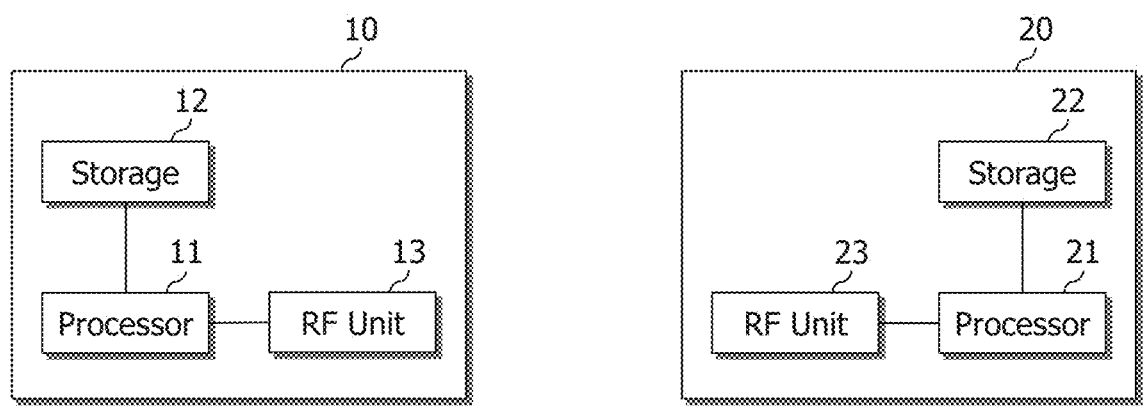
FIG. 14 is a block diagram of a network system configuration according to a disclosure of this specification.

FIG. 14 is a block diagram of a network system configuration according to a disclosure of this specification.

The User Equipment 10 includes a processor 11, a memory 12, and an RF unit 13. The memory 12 is connected to the processor 11 to store various information for driving the processor 11. The RF unit 13 is connected to the processor 11 to transmit and/receive a wireless signal. The processor 11 implements a suggested function, procedure, and/or method.

The base station 20 includes a processor 21, a memory 22, and a radio frequency RF unit 23. The memory 22 is connected to the processor 21 to store various information for driving the processor 21. The RF unit 23 is connected to the processor 201 to transmit and/receive a wireless signal. The processor 21 implements a suggested function, procedure, and/or method. An operation of the base station 20 according to the above embodiment may be implemented by the processor 21.

The processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module procedure, function, and the like to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for accessing a base station, the method performed by a user equipment (UE) and comprising:
receiving information broadcasted from the base station,
wherein the broadcasted information includes first information related to network slices being connected to the base station and second information related to capability of the base station;
determining an operation type of the UE based on the first information and the second information;
transmitting an Attach Request message to the base station,
wherein the Attach Request message includes third information related to the determined operation type;
receiving an Attach Accept message related to a first network slice, which is included in the network slices being connected to the base station,
wherein the first network slice is selected, by the base station, among the network slices being connected to the base station based on the third information;
receiving information broadcasted from an other base station different from the base station,
wherein the information broadcasted from the other base station includes fourth information related to network slices being connected to the other base station and fifth information related to capability of the other base station;
determining whether a handover to the other base station is possible based on the fourth information and the fifth information; and
transmitting sixth information, which notifies that the handover to the other base station is possible, to a network node managing mobility, based on that the handover to the other base station is possible.

2. The method of claim 1, wherein the determining the operation type comprises:
determining the operation type as a first type based on configuration elements of the UE and processing capability of the UE; and
determining the operation type as a second type based on the first information and the second information, based on that a service related to the first type is not supported.

3. The method of claim 1, wherein the first information includes filtered information of a network slice which is not supported by a Radio Access Network (RAN), among the network slices being connected to the base station.

4. The method of claim 1, wherein the first network slice is selected from network slices supporting a service related to the determined operation type, based on the determined operation type, location information of the UE and transmission time of the Attach Request message.

5. The method of claim 1,
wherein the sixth information includes any one of information related to a service that is newly started in the UE, information related to a service that is ended in the UE, and information related to a change in mobility of the UE, and
wherein the network node managing mobility determines whether to perform the handover to the other base station based on the sixth information.

6. The method of claim 5, wherein the network node managing mobility determines to perform the handover in a dual connectivity format between an enhanced Long Term Evolution (eLTE) Radio Access Technology (RAT) base station and a fifth generation (5G) RAT base station.

7. A user equipment (UE) for accessing a base station, comprising:
a transceiver; and
a processor operatively coupled to the transceiver, the processor is configured to:
control the transceiver to receive information broadcasted from the base station,
wherein the broadcasted information includes first information related to network slices being connected to the base station and second information related to capability of the base station;
determine an operation type of the UE based on the first information and the second information;
control the transceiver to transmit an Attach Request message to the base station,
wherein the Attach Request message includes third information related to the determined operation type;

receive an Attach Accept message related to a first network slice, which is included in the network slices being connected to the base station, wherein the first network slice is selected, by the base station, among the network slices being connected to the base station based on the third information on the determined type;

control the transceiver to receive information broadcasted from an other base station different from the base station, wherein the information broadcasted from the other base station includes fourth information related to network slices being connected to the other base station and fifth information related to capability of the other base station, determine whether a handover to the other base station is possible based on the fourth information and the fifth information; and control the transceiver to transmit sixth information, which notifies that the handover to the other base station is possible to a network node managing mobility, based on that the handover to the other base station is possible.

8. The user equipment of claim 7, wherein the determine the operation type comprises:

determine the operation type as a first type based on configuration elements of the UE and processing capability of the UE; and determine the operation type as a second type based on the first information and the second information, based on that a service related to the first type is not supported.

9. The user equipment of claim 7, wherein the first information includes filtered information of a network slice which is not supported by a Radio Access Network (RAN), among the network slices being connected to the base station.

10. The user equipment of claim 7, wherein the first network slice is selected from network slices supporting a service related to the determined operation type, based on the determined operation type, location information of the UE and transmission time of the Attach Request message.

11. The user equipment of claim 7, wherein the sixth information includes any one of information related to a service that is newly started in the UE, information related to a service that is ended in the UE, and information related to a change in mobility of the UE, and wherein the network node managing mobility determines whether to perform the handover to the other base station, based on the sixth information.

12. The user equipment of claim 11, wherein the network node managing mobility determines to perform the handover in a dual connectivity format between an enhanced Long Term Evolution (eLTE) Radio Access Technology (RAT) base station and a fifth generation (5G) RAT base station.

* * * * *